United States Patent [19]
Kawasaka

[11] Patent Number: 5,715,330
[45] Date of Patent: Feb. 3, 1998

[54] DENSITY MODIFICATION DEVICE

[75] Inventor: Yasuki Kawasaka, Tenri, Japan

[73] Assignee: Sharp Kabushiki Kaisha, Osaka, Japan

[21] Appl. No.: 308,530

[22] Filed: Sep. 21, 1994

[30] Foreign Application Priority Data

Nov. 5, 1993 [JP] Japan .................. 5-276784
Dec. 20, 1993 [JP] Japan .................. 5-320095

[51] Int. Cl.$^6$ .................. G06K 9/00; G06K 9/40
[52] U.S. Cl. .................. 382/169; 382/274; 348/254; 358/458
[58] Field of Search .................. 382/207, 169, 382/274; 348/254; 358/458, 446, 461

[56] References Cited

U.S. PATENT DOCUMENTS

| | | | |
|---|---|---|---|
| 4,571,635 | 2/1986 | Mahmoodi | 382/266 |
| 4,642,683 | 2/1987 | Alkofer | 358/322 |
| 4,910,787 | 3/1990 | Umeda | 382/204 |
| 4,941,190 | 7/1990 | Jayce | 382/264 |
| 4,969,202 | 11/1990 | Groezinger | 382/204 |
| 5,524,070 | 6/1996 | Shin et al. | 382/274 |

FOREIGN PATENT DOCUMENTS 561972 3/1993 Japan.

Primary Examiner—Joseph Mancuso
Assistant Examiner—Anthony H. Kahng

[57] ABSTRACT

An image input section selects a plurality of sample points from an input image, and passes the density values of the sample points and pixels around them to a feature parameter extractor. The feature parameter extractor calculates the feature parameters of each sample point and passes them to a density modification function generator. The density modification function generator creates a density modification function for each sample point and passes the density modification function data to a density modification function modifier. The density modification function modifier determines a density modification function for all of the pixels, including those other than the sample points, and passes this density modification function data to a processor. The processor modifies image data delivered from the image input section, and passes the modified image data to a modified image output section.

9 Claims, 17 Drawing Sheets

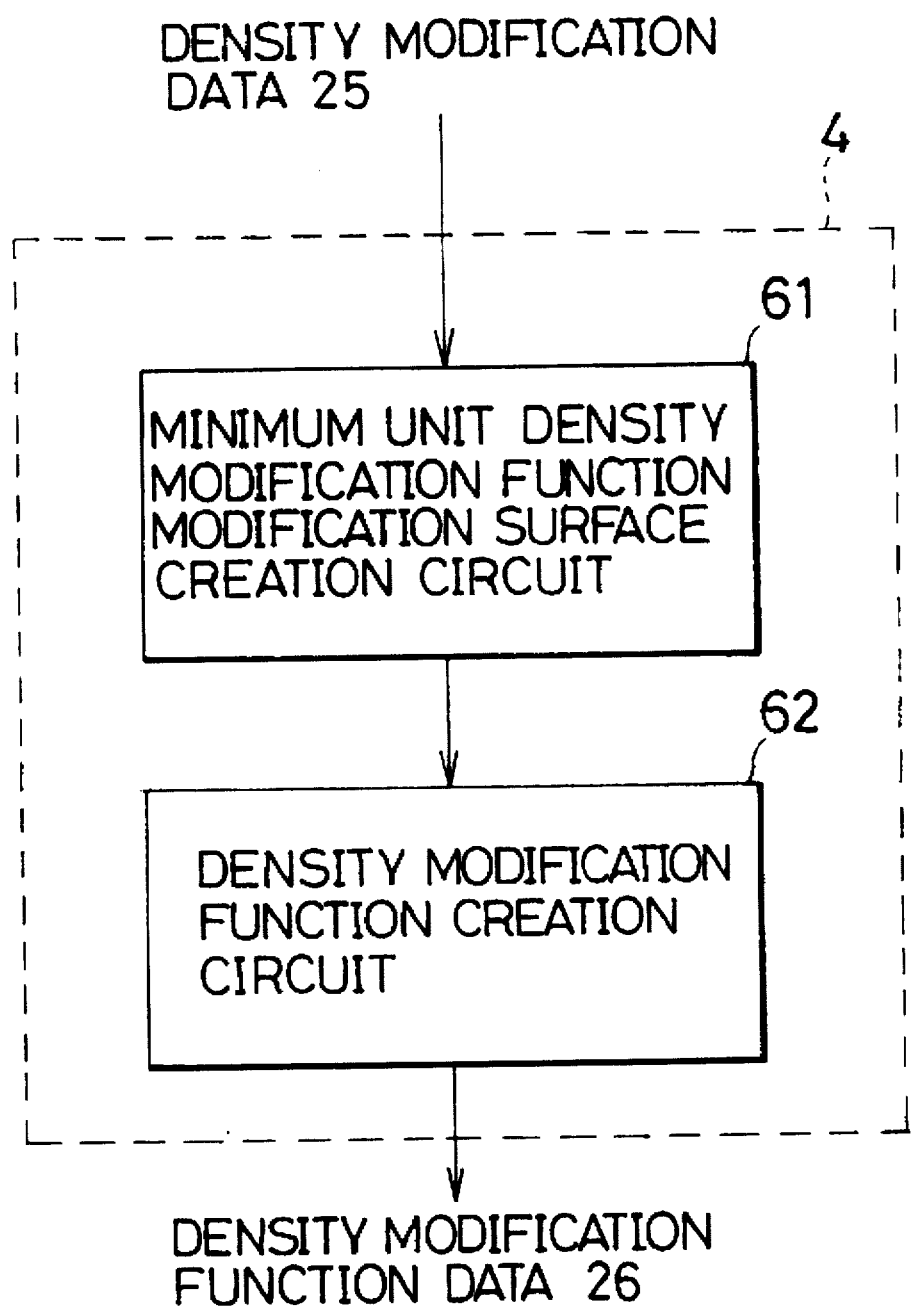

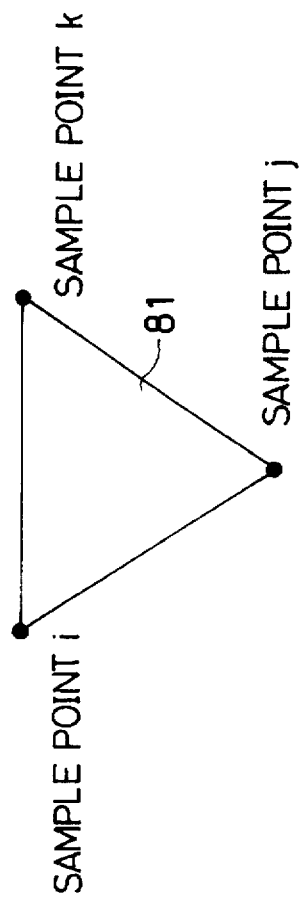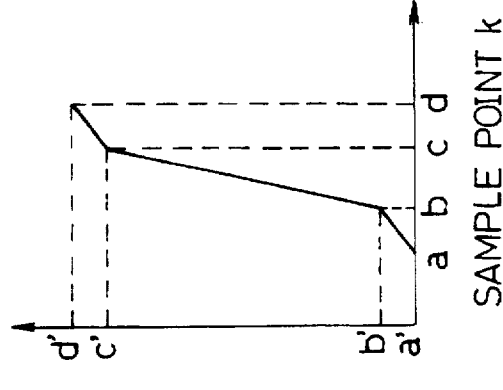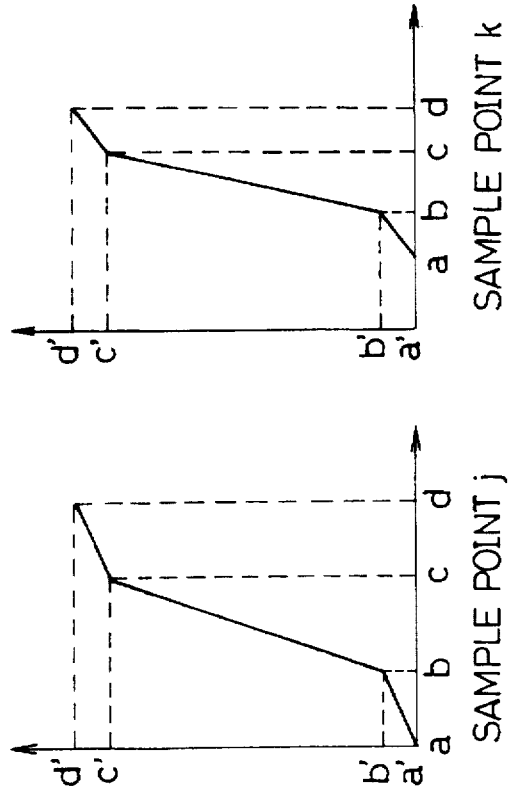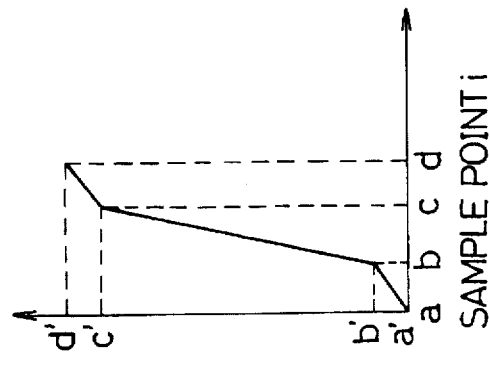

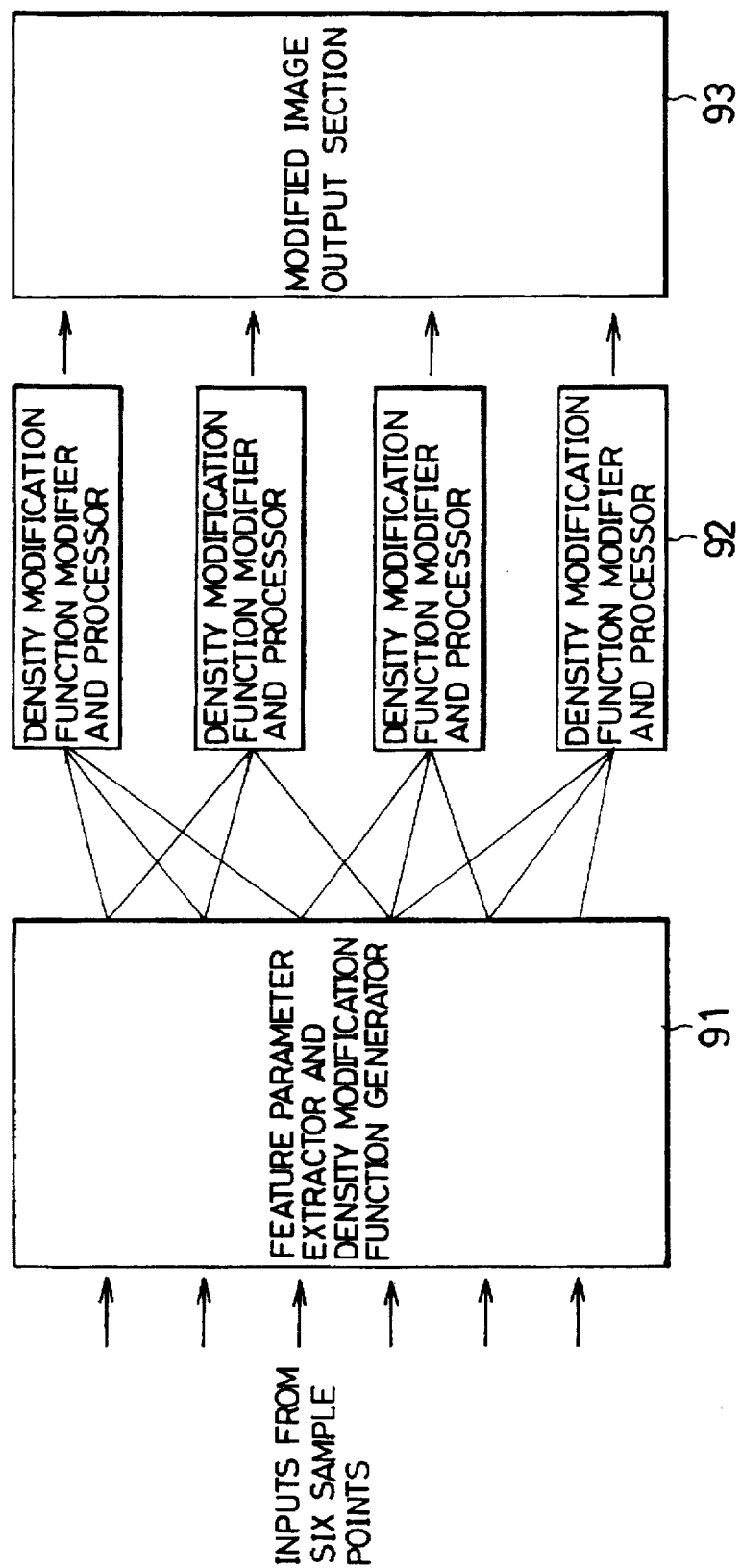

DENSITY MODIFICATION DEVICE

BACKGROUND OF THE INVENTION

1. Field of the Invention

The present invention relates to a density modification device for image data and, in particular, to a density modification device for correcting the density of image data transmitted from a camera or scanner.

2. Description of the Related Art

In the field of image processing, image recognition is sometimes difficult due to the location of the light source and the intensity of light. Different methods have thus been proposed to correct these difficulties.

For example, in 5-61972A entitled "Gradation Modification Device," a conventional density modification technique has been used to determine density modification functions for input images as follows: A plurality of data points for density values is extracted from an input image. The density values of the extracted pixels and the modified density values of these pixels are used as a set to prepare a graph showing the input density values on the horizontal axis and the output density values on the vertical axis. For example, a natural spline interpolation function for the respective points on the graph is determined and used as a density modification function. This method has univocally determined a density modification function for a single input image.

In the univocal determination of a density modification function for an input image, a density value histogram showing the density values on the horizontal axis and the numbers of pixels on the vertical axis, it is effective when the distribution of the histogram is concentrated in a certain input density value region. However, it destroys contrast information for the image if the distribution is uniform.

To solve such a conventional problem, it is the object of this invention to provide a density modification device that corrects the influence of the location and intensity of the light source and maintains contrast information for the image.

SUMMARY OF THE INVENTION

A density modification device in accordance with the first embodiment comprises an image input section for selecting a plurality of sample points from an input image and extracting the density values of the sample points and their surrounding pixels; a feature parameter extractor for calculating the feature parameters of the sample points while determining a density modification function determination method; a density modification function generator for generating density modification functions for the sample points; a density modification function modifier for using the density modification functions for the sample points to determine the density modification functions for points other than the sample points; and a processor for using the density modification functions determined by the density modification function modifier to modify the density of the input image.

The density modification function modifier may also use a determination signal to dynamically change density modification functions or add them up to determine the density modification functions for points other than the sample points.

A density modification device in accordance with the second embodiment comprises an image input section for selecting a plurality of sample points from an input image and extracting the density values of the sample points and their surrounding pixels; a reorganization section for using the density values of the sample points to determine whether or not to reorganize the sample points and, based on this determination, adding the sample points and dividing the modification region into sections to reorganize the sample points; a feature parameter extractor for calculating the feature parameters of the density values of the sample points; a density modification function generator for generating the density modification functions for the sample points; a density modification function modifier for using the density modification functions for the sample points to determine the density modification functions for points other than the sample points; and a processor for using the density modification functions determined by the density modification function modifier to modify the density of the input image.

According to the first embodiment, the image input section selects a plurality of sample points from an input image with a density gradation and extracts the density values of the sample points and their surrounding pixels. The feature parameter extractor calculates the feature parameters for the sample points and determines a density modification function determination method using the feature parameters. The density modification function generator generates a density modification function for each sample point using the feature parameters for each sample point from the feature parameter extractor. The density modification function modifier determines the density modification functions for those pixels in the input image other than the sample points using the density modification functions for the sample points near the pixels. The processor uses the density modification functions determined by the density modification function modifier to modify the density of the input image. Consequently, the density can be modified so that contrast information for the image can be maintained and the influence of the location and intensity of the light source can be corrected.

According to the second embodiment, the image input section selects a plurality of sample points from an input image and extracts the density values of the sample points and their surrounding pixels. The reorganization section creates new sample points and divides the modification region into sections to reorganize the sample points. The feature parameter extractor calculates the characteristic amounts for the sample points. The density modification function generator generates a density modification function for each sample point using the feature parameters for each sample point. The density modification function modifier determines the density modification functions for those pixels in the input image other than the sample points using the density modification functions for the sample points near the pixels. The processor uses the density modification functions determined by the density modification function modifier to modify the density of the input image. As a result, an adequate density can be obtained for both the dark and light regions of the image and the density changes smoothly in the boundary between the two regions. The overall image thus has a good contrast with the influence of the location of the light source and the intensity of light corrected.

Further objects and advantages of the present invention will be apparent from the following description of the preferred embodiments of the present invention as illustrated in the accompanying drawings.

BRIEF DESCRIPTION OF THE DRAWINGS

FIG. 5 describes the density modification function modifier in detail;

FIGS. 7a to 7d describe a dynamic density modification function modification method;

FIG. 17 shows the configuration of a density modification device involving parallel processing.

DESCRIPTION OF THE PREFERRED EMBODIMENTS

Figure 1:
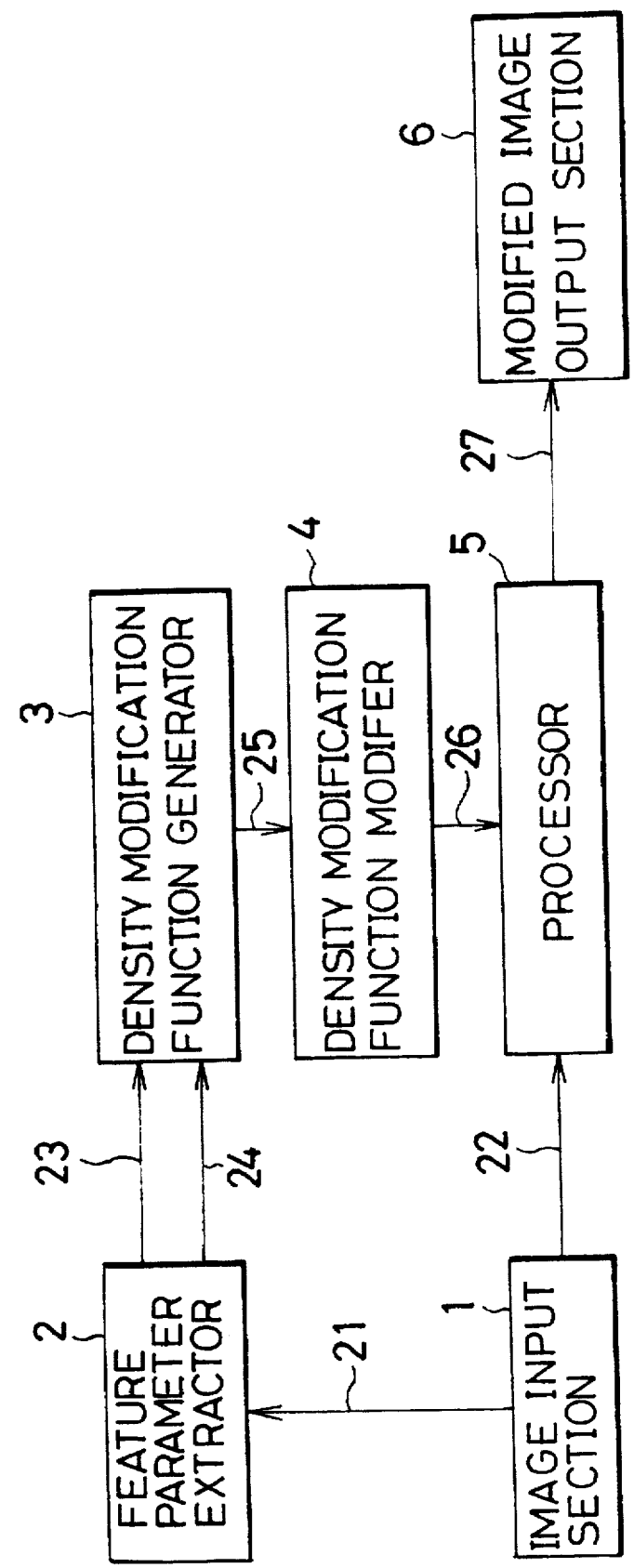
FIG. 1 is a block diagram showing an embodiment of the present invention.

FIG. 1 shows a first embodiment of this invention. An image input section 1 selects a plurality of sample points from an input image, and passes the density values 21 of the selected sample points and their surrounding pixels to a feature parameter extractor 2. The feature parameter extractor 2 uses the density values 21 to calculate the feature parameters 24 for each sample point. It also determines a density modification method based on the feature parameters 24, and passes a determination signal 23 and the feature parameters 24 for each sample point to a density modification function generator 3. The density modification function generator 3 generates a density modification function for each sample point based on the determination signal 23 and feature parameters 24, and passes the density modification function data 25 to the density modification function modifier 4. The density modification function modifier 4 uses the density modification function for each sample point to determine density modification functions for all of the pixels, including pixels other than the sample points, and passes the density modification function data 26 to a processor 5. The processor 5 modifies the image data 22 delivered from the image input section 1 using the density modification function data 26 to pass the density-modified image data 27 to a modified image output section 6.

Each section is described below in detail. The image input section 1 selects a plurality of sample points from an input image, passes the density values 21 of each sample and its surrounding pixels to the feature parameter extractor 2, and passes image data to the processor.

Figure 3A:
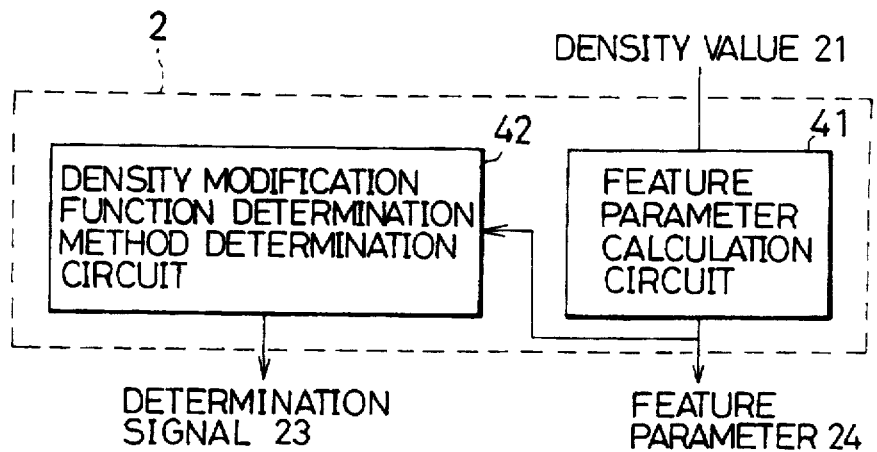
FIGS. 3a to 3c describe the feature parameter extractor in detail.

The feature parameter extractor 2 is described with reference to FIG. 3a. The feature parameter extractor 2 comprises a feature parameter calculation circuit 41 for receiving a density value 21 from the image input section 1 to calculate and output feature parameters 24, and a density modification function determination method determination circuit 42 for determining a modification method for a density modification function from any threshold of the feature parameters 24 to output a determination signal 23.

Figure 3B:
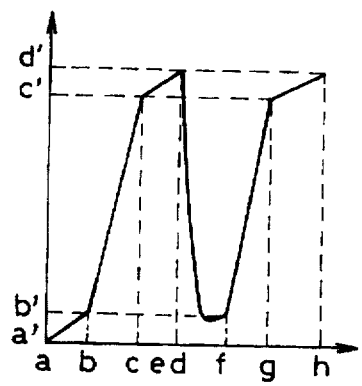
Figure 3C:
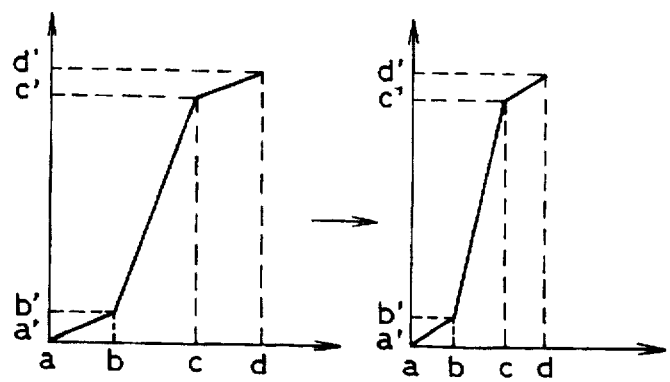
Figure 6A:
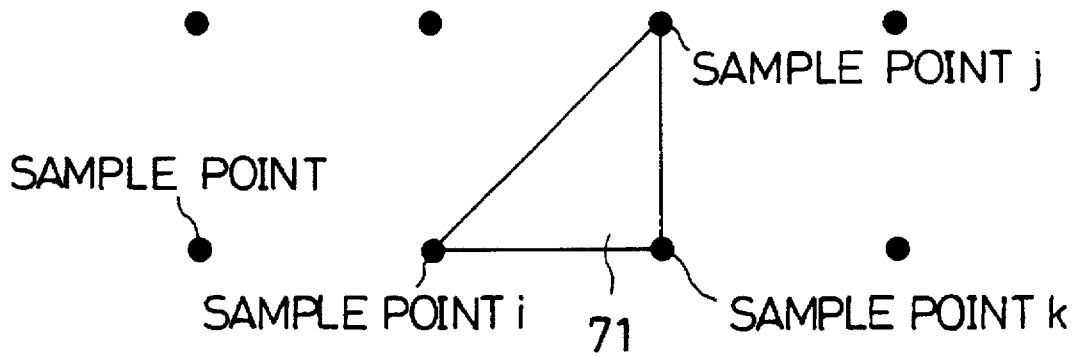
FIGS. 6a and 6b describe a density modification function modification region.
Figure 6B:
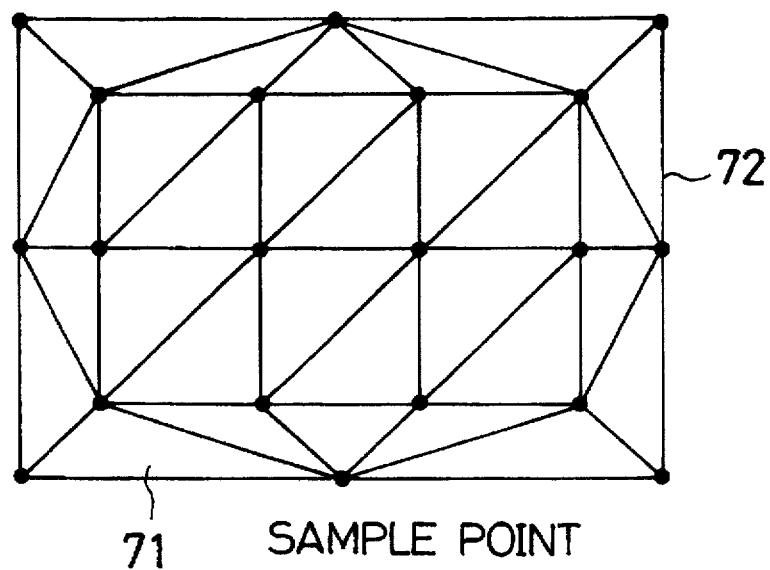
Figure 15:
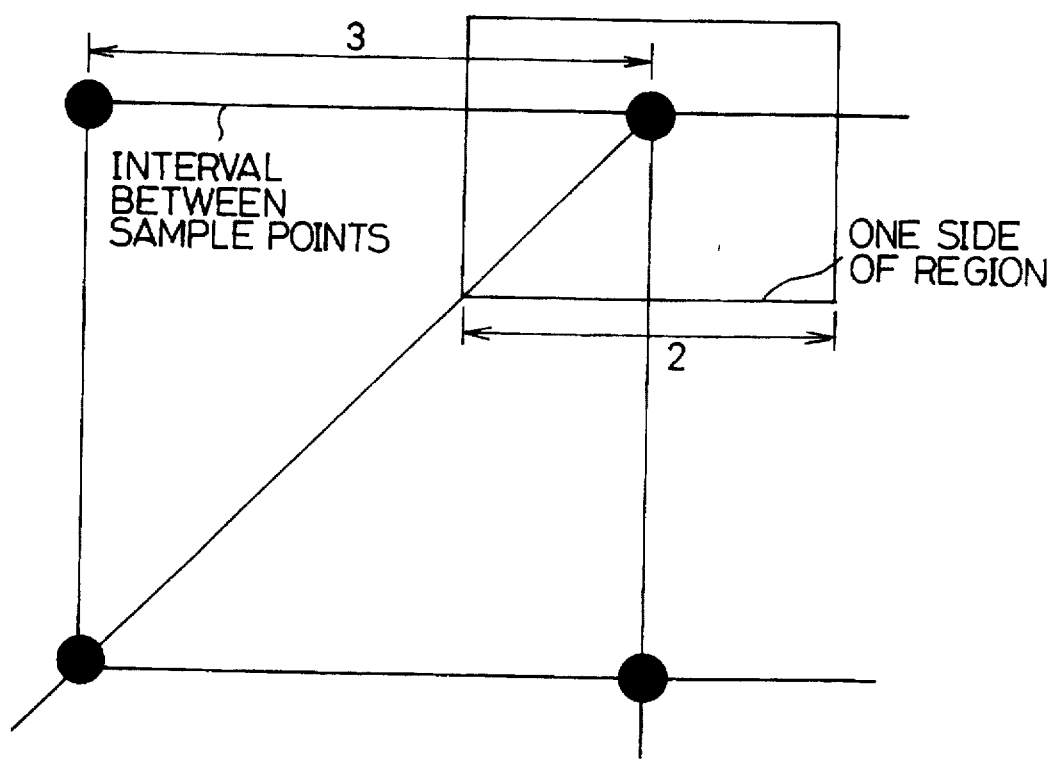
FIG. 15 shows the periphery of sample points.

The feature parameter extractor 2 with the above configuration operates as follows. The feature parameter extractor 2 receives a density value 21 from the image input section 1. The feature parameter extractor 2 uses the feature parameter calculation circuit 41 to calculate the maximum, minimum, and average values of density values around each sample point using the received density values 21, and outputs the feature parameters 24. The combination of the three respective sample points is determined in advance. This combination is described with reference to FIG. 6a. The 12 points in this figure are sample points. A combination of three sample points (i), (j), and (k) comprises a triangular density modification function modification region 71. The triangular density modification function modification regions 71 are organized over the entire input image as shown in FIG. 6b; these regions are generally called a triangular density modification function modification network region 72. FIG. 15 shows an example of a method for determining a region around a sample point. The points and rectangle in this figure are sample points and a region around a sample point. The rate of the interval between the sample points to one side of the peripheral region is preferably about 3:2. The density modification function determination method for each triangular density modification function modification region 71 uses the density modification function determination method determination circuit 42 to output a determination signal 23 indicating what modification method has been selected based on any threshold of the characteristic amounts 24. The density modification function determination method for the triangular density modification function modification region 71 includes an addition function modification wherein two functions are added up as shown in FIG. 3b and a dynamic density modification function modification method wherein a function is varied dynamically as shown in FIG. 3c. The horizontal axis and vertical axis in FIGS. 3b and 3c represent input densities and output densities. Elements (a), (b), (c), (d), (e), (f), (g), and (h) represent input density values, and (a'), (b'), (c'), and (d') represent output density values that are constants. The method to be adopted is determined by the following procedure: The following processing is performed when two of the three sample points are called sample points 1 and 2, the feature parameters for the sample point 1 are a maximum value 1, an average value 1, and a minimum value 1, and the feature parameters for the sample point 2 are a maximum value 2, an average value 2, and a minimum value 2.

A maximum value 1, an average value 1, a minimum value 1, a maximum value 2, an average value 2, a minimum value 2 if ((maximum value 1<minimum value 2) or (maximum value 2<minimum value 1)) then addition is executed.

else, dynamic processing is performed.

The density values corresponding to the trough between the two peaks in the graph in FIG. 3b represent pixels in the edge of the image, that is, pixels with a sudden change in density. Since this method allows a quick response to these density values, it can modify an image such as that in FIG. 9b (triangular region unit). Since the method in FIG. 8c varies the modification function based on changes in density, it can modify an image such as that in FIG. 9a.

The use of addition and dynamic processing thus allows the device to recognize and identify the effect of the light source on an image to correct the density of the image so that the effect can be optimum for the observer without the observer being conscious of the effect.

Figure 2:
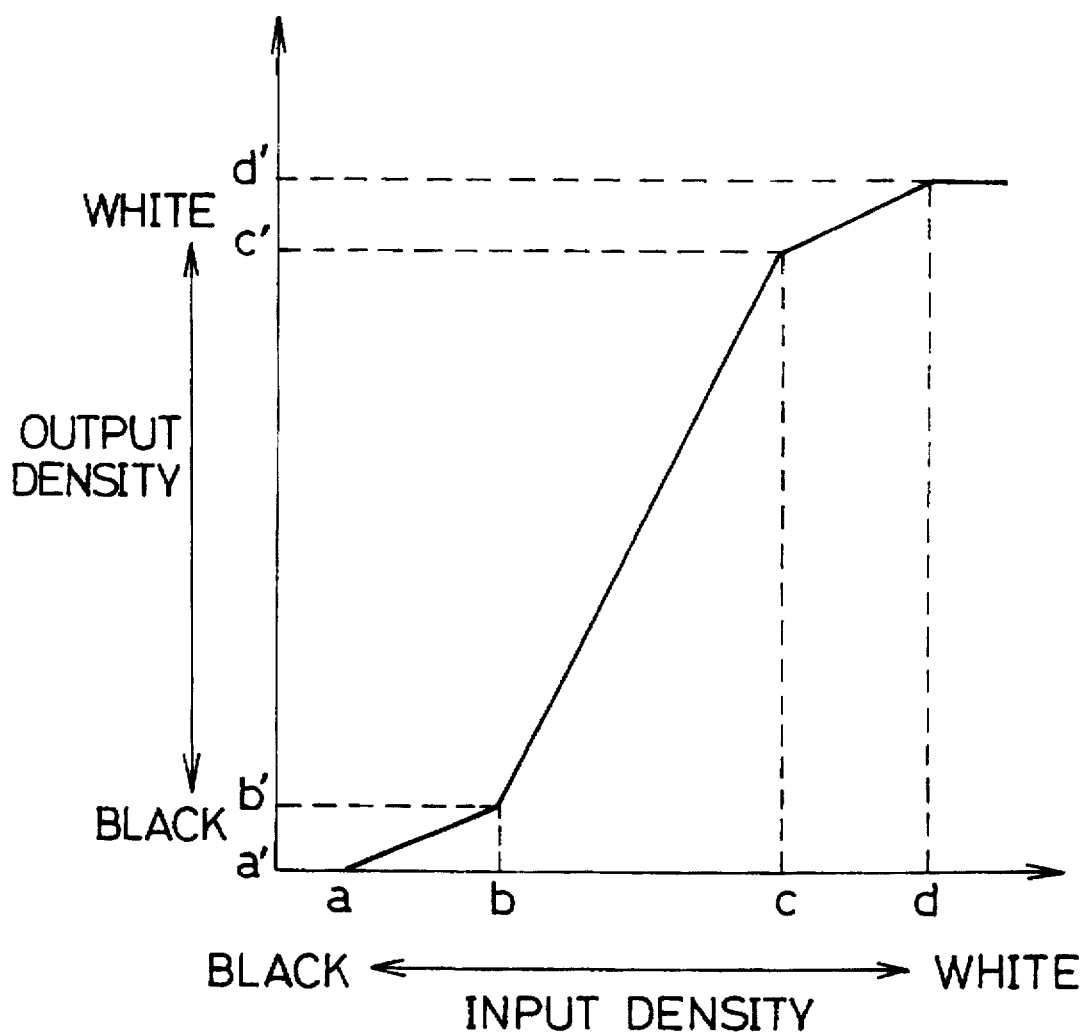
FIG. 2 describes a reference density modification function.
Figure 4:
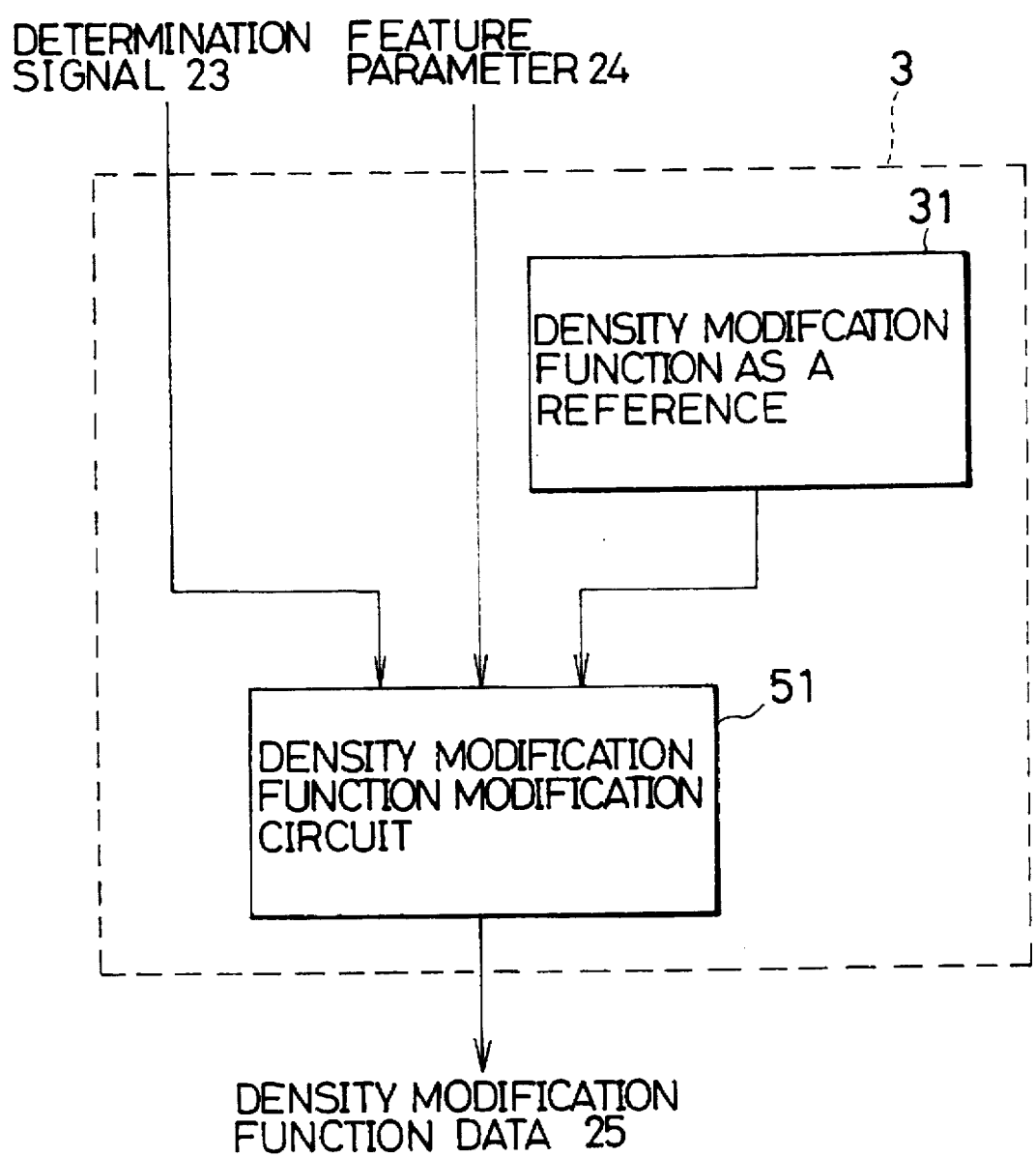
FIG. 4 describes the density modification function generator in detail.

The density modification function generator 3 is described with reference to FIG. 4. The density modification function generator 3 comprises a density modification function circuit 51 for generating a density modification function for each sample point using a reference density modification function feature parameters 24, and a determination signal 23 to output a combination of input and output density values as density modification function data The density modification function generator 3 with the above configuration operates as follows. The density modification function generator 3 has one reference density concentration function 31 as shown in FIG. 2. Elements (a), (b), (c), and (d) in FIG. 2 represent input density values for the respective singular points for the reference density modification function 31 in FIG. 2, and elements (a'), (b'), (c'), and (d') represent the corresponding output density values. When the output density values (a'), (b'), (c'), and (d') are constants and the input density values (a), (b), (c), and (d) are variables, the reference density modification function 31 in FIG. 2 can represent a nearly infinite number of density modification functions. The reference density modification function 31 can be expressed in terms of Equations (1), (2), (3), (4), and (5).

$$Y=a' \tag{1}$$

$$Y=[(b'-a')/(b-a)]X \tag{2}$$

$$Y=[(c'-b')/(c-b)]X \tag{3}$$

$$Y=[(d'-c')/(d-c)]X \tag{4}$$

$$Y=d' \tag{5}$$

Elements (a'), (b'), (c'), and (d') represent any constant output density value, and elements (a), (b), (c), and (d) represent input density values determined by the feature parameters for each sample point. Equation (1) holds when the input density is (a) or less; Equation (2) holds when the input density is (a) or more and (b) or less; Equation (3) holds when the input density is (b) or more and (c) or less; Equation (4) holds when the input density is (c) or more and (d) or less; and Equation (5) holds when the input density is (d) or more.

The density modification function modification circuit 51 determines (a), (b), (c), and (d) using a determination signal 23 and feature parameters 24 from the feature parameter extractor 2 as inputs as well as a reference density modification function 31 and also using Expressions (6), (7), (8), and (9), below. The circuit 51 then outputs combinations of these input density values and the output density values (a'), (b'), (c'), and (d') from the density modification in FIG. 2, (a, a'), (b, b'), (c, c'), and (d, d') as density modification function data $$a=\text{minimum value} \tag{6}$$

$$b=(\text{average value}-\text{minimum value})/C \tag{7}$$

(C is a constant.)

$$c=(\text{maximum value}-\text{average value})/C' \tag{8}$$

(C' is a constant.)

$$d=\text{maximum value} \tag{9}$$

The density modification function modifier 4 is described with reference to FIG. 5. The density modification function modifier 4 comprises a minimum unit density modification function modification surface creation circuit 61 for creating minimum unit density modification function modification surfaces 81 from density modification function data 25 and a density modification function creation circuit 62 for modifying density modification functions for three sample points to determine density modification functions for target pixels other than the sample points.

The density modification function modifier 4 with the above configuration operates as follows. Density modification function data 25 is input to the minimum unit density modification function modification surface creation circuit 61 in FIG. 5. Triangular density modification function modification regions 71 are determined for the sample points as in the feature parameter extractor 2. When the dynamic method shown in FIG. 3c is selected as the modification function modification method for a triangular density modification function modification region 71, the X and Y coordinates relative to the input image of each of the three sample points and input density values in the density modification function data 25 are expressed on the X, Y, and Z axes to create four minimum unit density modification function modification surfaces 81 for each input density value (a), (b), (c), and (d) for each combination of sample points. A method for creating a minimum unit density modification function modification surfaces 81 is described with reference to FIG. 6a. The sample points (i), (j), and (k) in FIG. 6a have coordinates (Xi, Yi), (Wj, Yj), and (Xk, Yk) relative to the input image and input and output density values in the density modification function data 25 ((ai, a'i), (bi, b'i), (ci, c'i), (di, d'i)), ((aj, a'j), (bj, b'j), (cj, c'j), (dj, d'j)), and ((ak, a'k), (bk, b'k), (ck, c'k), (dk, d'k)). The coordinates and the input density values in the density modification function data 25 are then assigned to Equation (10) for each element of the input density value in the density modification function data 25 to solve ternary simultaneous equations. This determines coefficients A, B, C, and D in Equation (10) for each element of the input density value in the density modification function data 25 to determine the minimum unit density modification function modification surfaces 81.

$$Z=\{D-(AX+BY)\}/C \tag{10}$$

X: X coordinate of a target pixel

Y: Y coordinate of a target pixel

Z: Reference density value for a density modification function for a target pixel (input density values (a), (b), (c), and (d) in FIG. 2)

A, B, C, and D: Coefficients for any minimum unit density modification function surface For example, ternary simultaneous equations for determining a minimum unit density modification function surface for (ax, a'x) (x)=(i), (j), (k)) with a density value of 26 are shown as Equations (11), (12), and (13). Similar calculations are carried out for the other density values.

$$ai = \{D-(A \cdot Xi + B \cdot Yi)\}/C \quad (11)$$

$$aj = \{D-(A \cdot Xj + B \cdot Yj)\}/C \quad (12)$$

$$ak = \{D-(A \cdot Xk + B \cdot Yk)\}/C \quad (13)$$

Figure 8C:
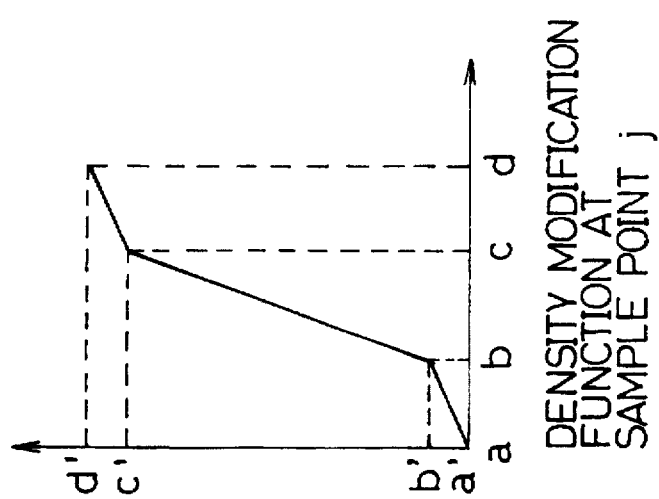
FIGS. 8a to 8c show changes in the density modification function between one sample point (i) and another sample point (j)
Figure 8B:
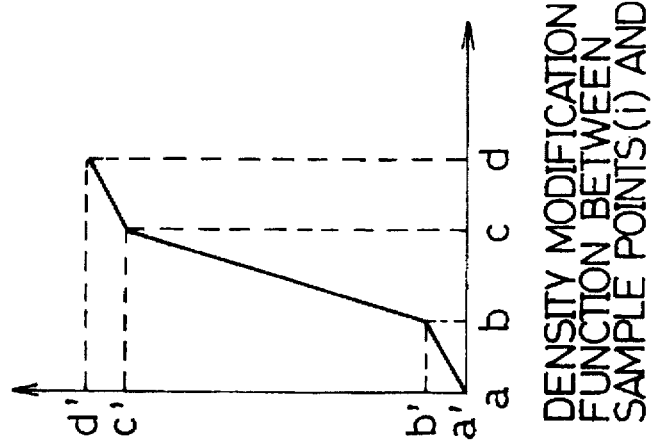
Figure 8A:
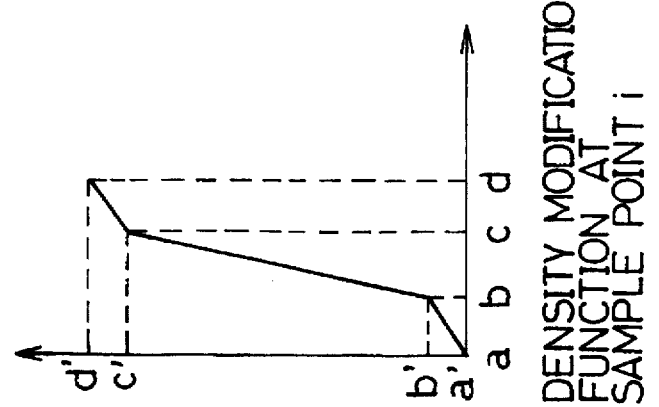
Figure 9A:
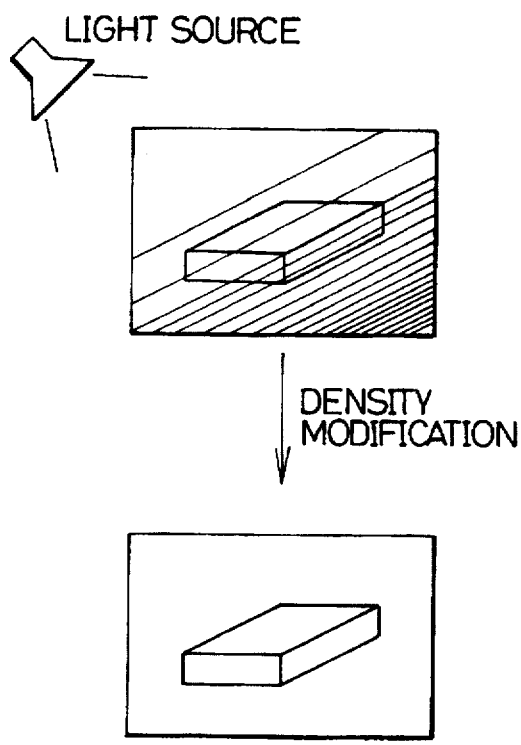
FIGS. 9a and 9b describe the correction of an image made unsatisfactory by the location of the light source and the intensity of light.
Figure 9B:
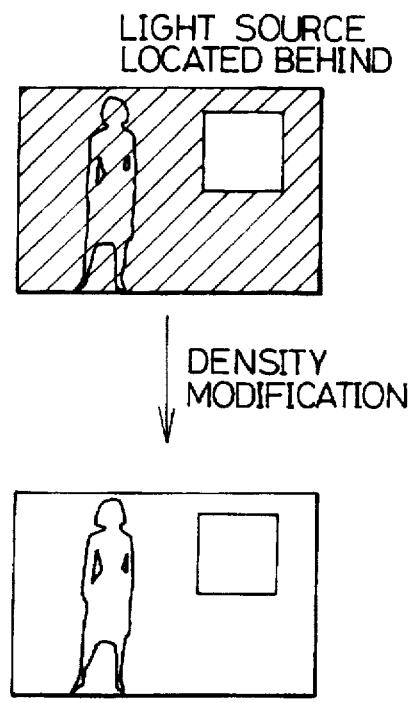

When the dynamic method shown in FIG. 3c is selected as a modification function modification method, the density modification function creation circuit 62 uses the distances among the three sample points and target pixels other than the sample points within each minimum unit density modification function modification surface to modify the density modification functions for the three points to determine density modification functions for the pixels. The determination method is described below with reference to FIGS. 7a to 7d. FIG. 7a shows a minimum density modification function modification surface 81 determined from the sample points (i), (j), and (k). In FIGS. 7b and 7c, the horizontal axis represents input densities, and the vertical axis represents output densities. Elements (a), (b), (c), and (d) represent input density values, and elements (a'), (b'), (c'), and (d') represent output density values. In the minimum density modification function modification surface 81 shown in FIG. 7a, a density modification function has been determined for each of the sample points (i), (j), and (k) as shown in FIGS. 7b, 7c, and 7d. The density modification function creation circuit 62 shown in FIG. 5 assigns coefficients A, B, C, and D to Equation (10) for each element determined using combinations of input and output density values in the graph in FIG. 2 (a, a'), (b, b'), (c, c'), and (d, d') and the coordinates relative to the image of target pixels within the minimum density modification function modification surface. The combinations of input and output density values in the graph in FIG. 2 (a, a'), (b, b'), (c, c'), and (d, d') are thereby determined and density modification functions are generated for the pixels. When the three points are the vertexes of a triangle, the density modification function varies dynamically between the sample point (i) and sample point (j) as shown in FIGS. 8a to 8b and then to 8c. In FIGS. 8a to 8c, the horizontal axis represents input densities and the vertical axis represents output densities. Elements (a), (b), (c), and (d) represent input density values, and elements (a'), (b'), (c'), and (d') represent output density values that are constants. FIGS. 8a and 8c show density modification functions for the sample points (i) and (j). FIG. 8b shows a density modification function for a point between the sample points (i) and (j).

Figure 16C:
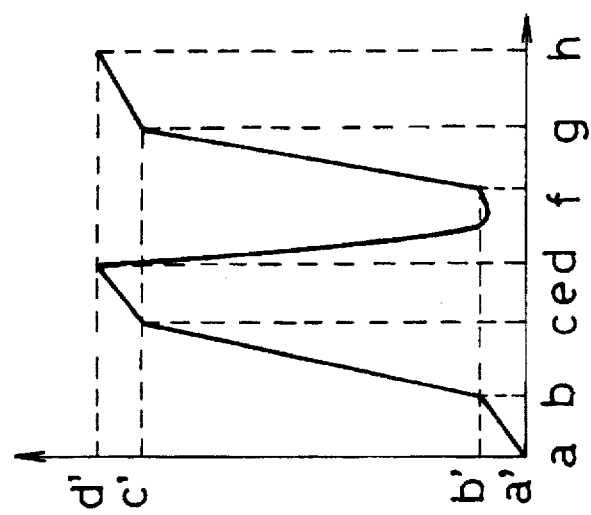
FIGS. 16a to 16c describe the addition of two density modification functions.
Figure 16B:
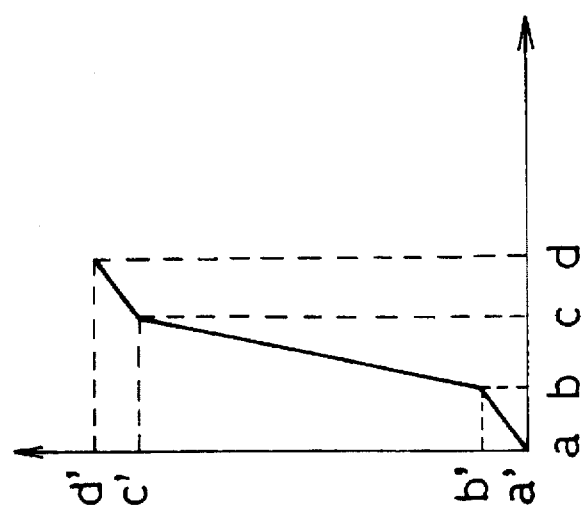
Figure 16A:
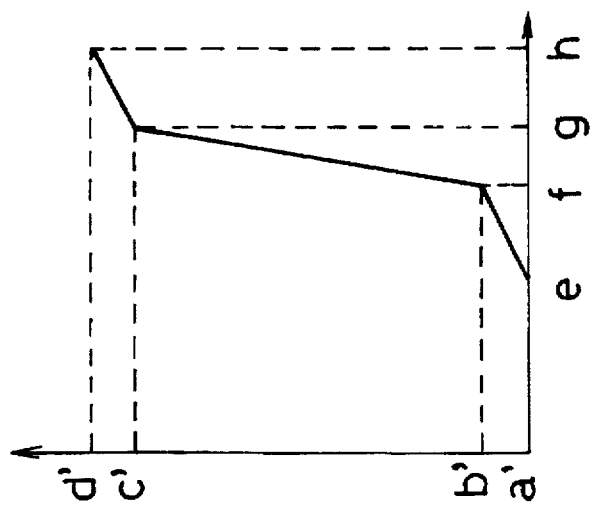

When the addition method shown in FIG. 3b is selected as a modification function modification method, the density modification function creation circuit 62 adds up density modification functions for sample points using the modification function modification method shown in FIG. 3b. For an overlapping region between the two functions, the values at both ends of the region are used for interpolation with a linear function; otherwise, similar processing is performed to determine a density modification function before the density is modified. The method for adding up density functions is described with reference to FIGS. 16a to 16c. In FIGS. 16a to 16c, the horizontal axis represents input densities, and the vertical axis represents output densities. Elements (a), (b), (c), (d), (e), (f), (g), and (h) represent input density values, and elements (a'), (b'), (c'), and (d') represent output density values that are constants. The function in FIG. 16a is added to the function in FIG. 16b to provide the function in FIG. 16c. For the boundary between (e) and (f) on the horizontal line, interpolation is carried out to provide a single function.

The reference density modification function 31 is arbitrary and any such function can be used to meet a particular purpose. In addition, parallel processing for individual minimum unit density modification function modification surfaces permits faster operation. FIG. 17 shows the configuration of a device for processing, in parallel, four triangular regions comprising six sample points. Density information from six sample points is input to a feature parameter extractor and density modification function generator 91. The feature parameter extractor and density modification function generator 91 create density modification function data for each sample point to provide density modification data for the three sample points constituting the triangular region for four density modification function modifiers and processors 92 for processing the respective triangular regions. The four density modification function modifiers and processors 92 perform processing in parallel and transmit the results to a modified image output section 93.

A second embodiment is hereafter described.

The first embodiment divides an input image into several local regions based on the brightness of the image to determine the optimum density modification functions for the respective regions for correcting the dynamic density, instead of determining a univocal density modification function for the overall image.

This technique has disadvantages in that major errors occur if the density varies diversely because the density of an image is determined by linear interpolation for the densities of data sample points and in that there is not yet an established method for setting data sample points in such a region, as in 5-61972A Gray Scale converter, above.

In addition, since processing is based on the assumption that data sample points have already been determined, major errors in density modification function occur where the brightness varies sharply.

It is therefore the object of the second embodiment of this invention to increase or decrease the number of sample points, based on the variation in brightness, to change the region for the calculation of density, and thereby improve the accuracy of density modification.

Figure 10A:
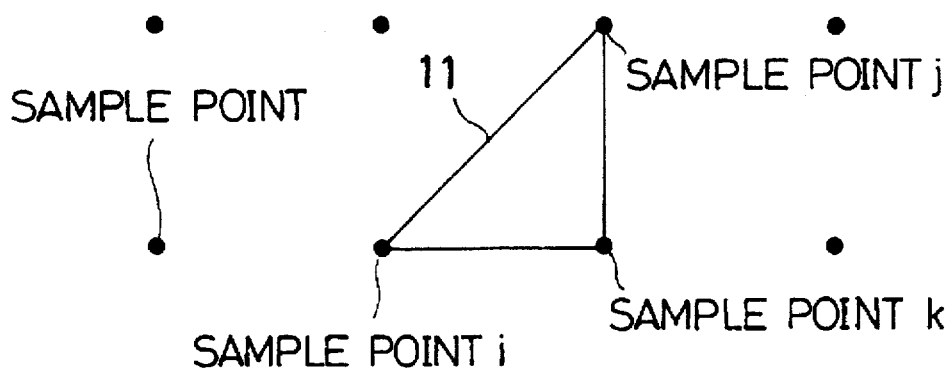
FIGS. 10a and 10b describe a "combination"
Figure 10B:
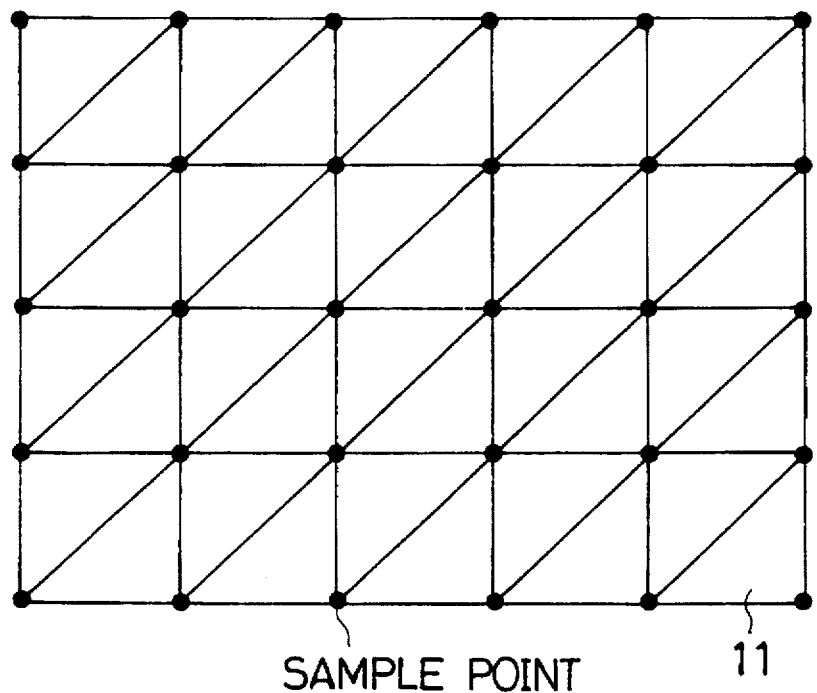

For an input image, the coordinates of sample points and their "combinations" are set in accordance with a predetermined method. FIG. 10a shows a "combination" of sample points. The 12 points in FIG. 10a are sample points. A combination of three sample points (i), (j), and (k) constitutes a triangular region 11. The overall input image is divided into triangular regions defined in this manner as shown in FIG. 10b.

A density modification function is defined for each sample point. The shape of the function is defined in terms of the special capabilities of the human eye and statistics for the distribution of the densities of pixels near a particular sample point (maximum, minimum, and average values). A method for determining the density modification function is described below. The density modification functions for the three sample points (i), (j), and (k) are referred to as Fi, Fj, and Fk, and the reference density function for determining Fi, Fj, and Fk is referred to as Fx. FIG. 2 shows an example of density function Fx.

When input density values are referred to as di, dj, and dk when Equation (14) holds for the output density value dout, the input density value dp of any point (p) within the triangular region corresponding to dour can be determined from di, dj, and dk using linear interpolation. When this operation is performed for the overall range of dout, the density modification function Fp for the point (p) can be determined. When the density of the point P is (n), then the output density of the point (p) is Fp(n).

dout=Fi (di)=Fj (dj)=Fk (dk)

Figure 11:
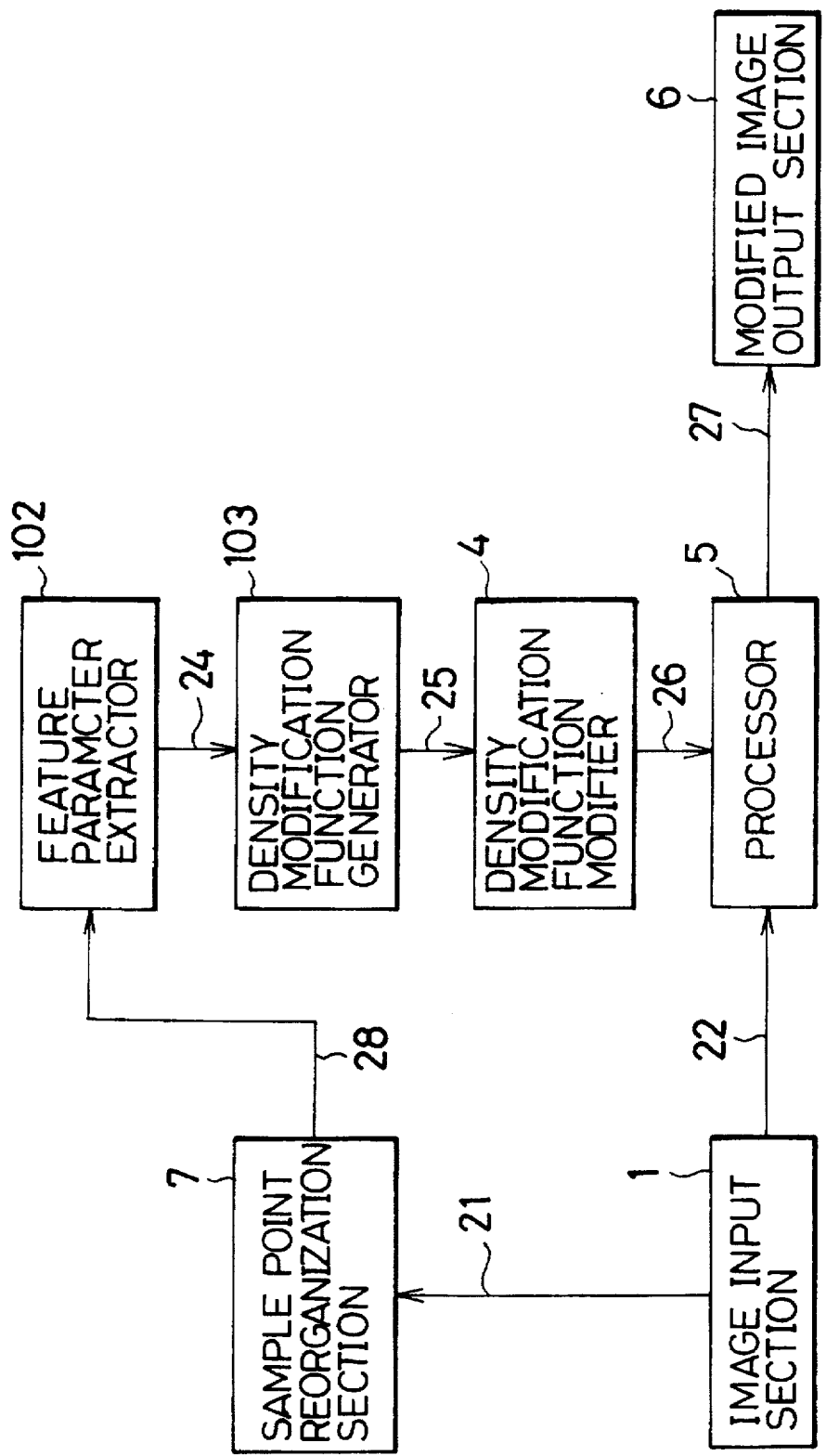
FIG. 11 is a block diagram showing a second embodiment.

FIG. 11 shows the configuration of a density modification device in accordance with the second embodiment of this invention. An image input section 1 selects a plurality of sample points whose coordinates relative to the image and combination with other sample points have already been determined from an input image, and passes the density values 21 of the sample points and pixels around them to a sample point reorganization section 7. The sample point reorganization section 7 uses the density values 21 to determine whether or not to reorganize the "combinations." When the result is positive, it creates new sample points and the region formed by the combination of the original sample points to organize new "combinations." It then passes the reorganization data 28 to a feature parameter extractor 102. The feature parameter extractor 102 calculates feature parameters for each sample point and passes them to a density modification function generator 103. The density modification function generator 103 creates a density modification function for each sample point based on the feature parameters 24, and passes the density modification function data 25 to a density modification function modifier 4. The density modification function modifier 4 uses the density modification function data 25 to determine a density modification function for all of the pixels including those other than the sample points, and passes density modification function data 28 to a processor 5. The processor 5 uses the density modification function data 28 to modify image data 22 delivered from the image input section 1, and passes the modified image data 27 to a modified image output section 8.

Each section is described in detail. The image input section 1 sections an input image into triangular regions using the preset coordinates of each sample point and information for the combination of each sample point with others. It then passes the density values 21 of each sample point and pixels near it to the sample point reorganization section 7, and also delivers image data 22 to the processor.

FIGS. 12a to 12e shows the algorithm of the sample point reorganization section 7. The points and triangular region in FIGS. 12a to 12e are sample points and a triangular region.

Step 1: Unprocessed triangular regions are selected. The sample points that constitute the triangular region are referred to as (i), (j), and (k).

Figure 12A:
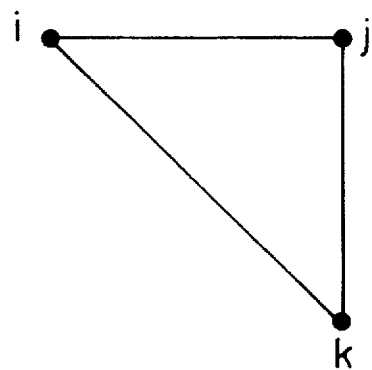
FIGS. 12a to 12e describe the algorithm of the sample point reorganization section.
Figure 12B:
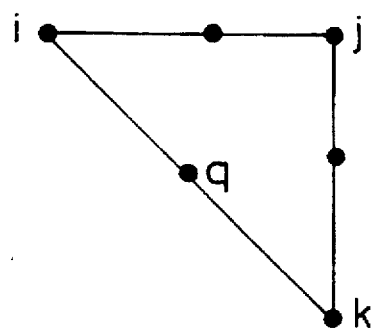
Figure 12D:
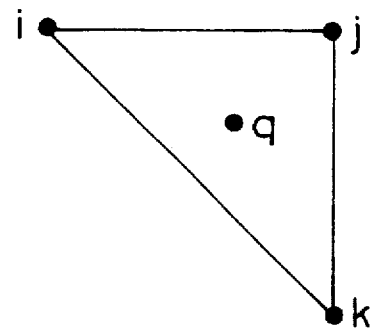
Figure 12C:
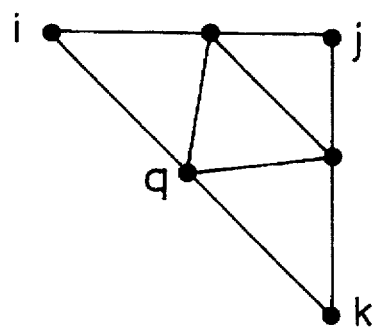
Figure 12E:
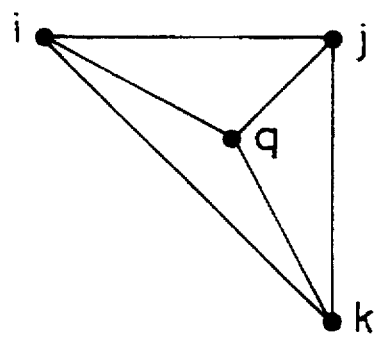

Step 2: When the density average values of the sample points are referred to as ni, nj, and nk, a new sample point (q) is added onto a side of the triangle as shown in FIGS. 12b and 12c or inside the triangle as shown in FIGS. 12d and 12e to subdivide the triangle when |ni−nj|+|nj−nk|+|nk−ni|>Constant.

However, if |ni−nj|+|nj−nk|+|nk−ni|≦Constant, the next triangular region is processed.

In this manner, all of the triangular regions are divided into sections, and the density values 28 of sample points including a new sample point and pixels near them for each "combination" are passed to the feature parameter extractor 102.

The feature parameter extractor 102 is described: The feature parameter extractor 102 receives the density values 28 from the sample point reorganization section 7 to calculate the maximum, minimum, and average density values for each sample point as feature parameters 24. It then outputs the feature parameters 24 to the density modification function generator 103.

Figure 13:
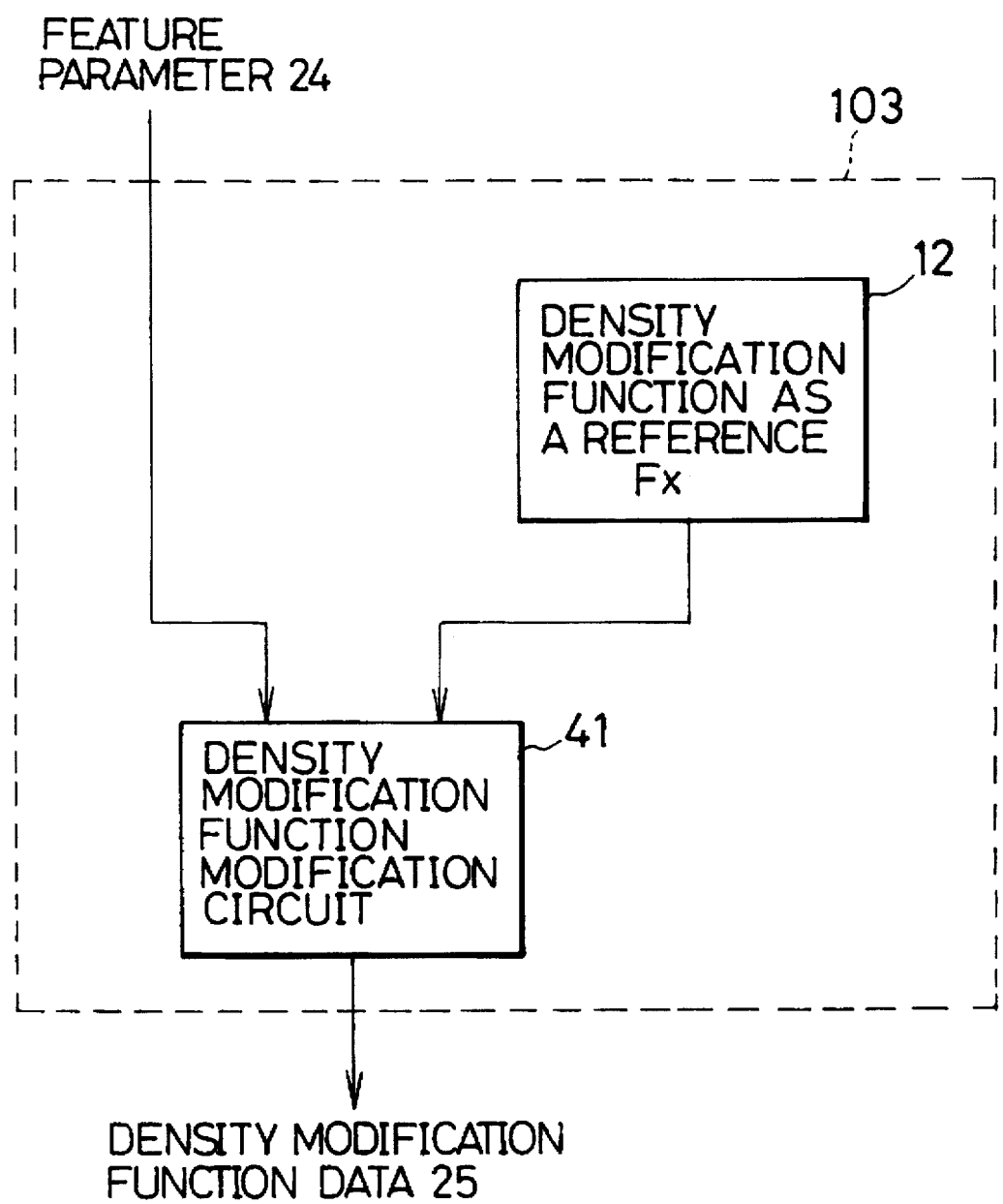
FIG. 13 describes the density modification function generator in detail.

The density modification function generator 103 is described with reference to FIG. 13. If the function shown in FIG. 2 is a reference density function Fx used by the density modification function generator 103, the density function Fx can be expressed as a nearly infinite number of density modification functions as well as in terms of Equations (1), (2), (3), (4), and (5) when (a), (b), (c), and (d) in FIG. 2 are defined as sectioning input density values mdx (x=i, j, k) for the density function Fx, and the output density values (a'), (b'), (c'), and (d') that are constants are referred to as mdout. A density modification function modification circuit 41 uses the feature parameters 24 supplied by the feature parameter extractor 102 as inputs as well as Fx and also uses Equations (6), (7), (8), and (9) to determine density modification functions Fi, Fj, and Fk for the three sample points (i), (j), and (k). The "combination" Din of the input density values (mdi, mdj, and mdk) for Fi, Fj, and Fk is output as density modification function data 25 together with the output density value mdout.

Figure 14:
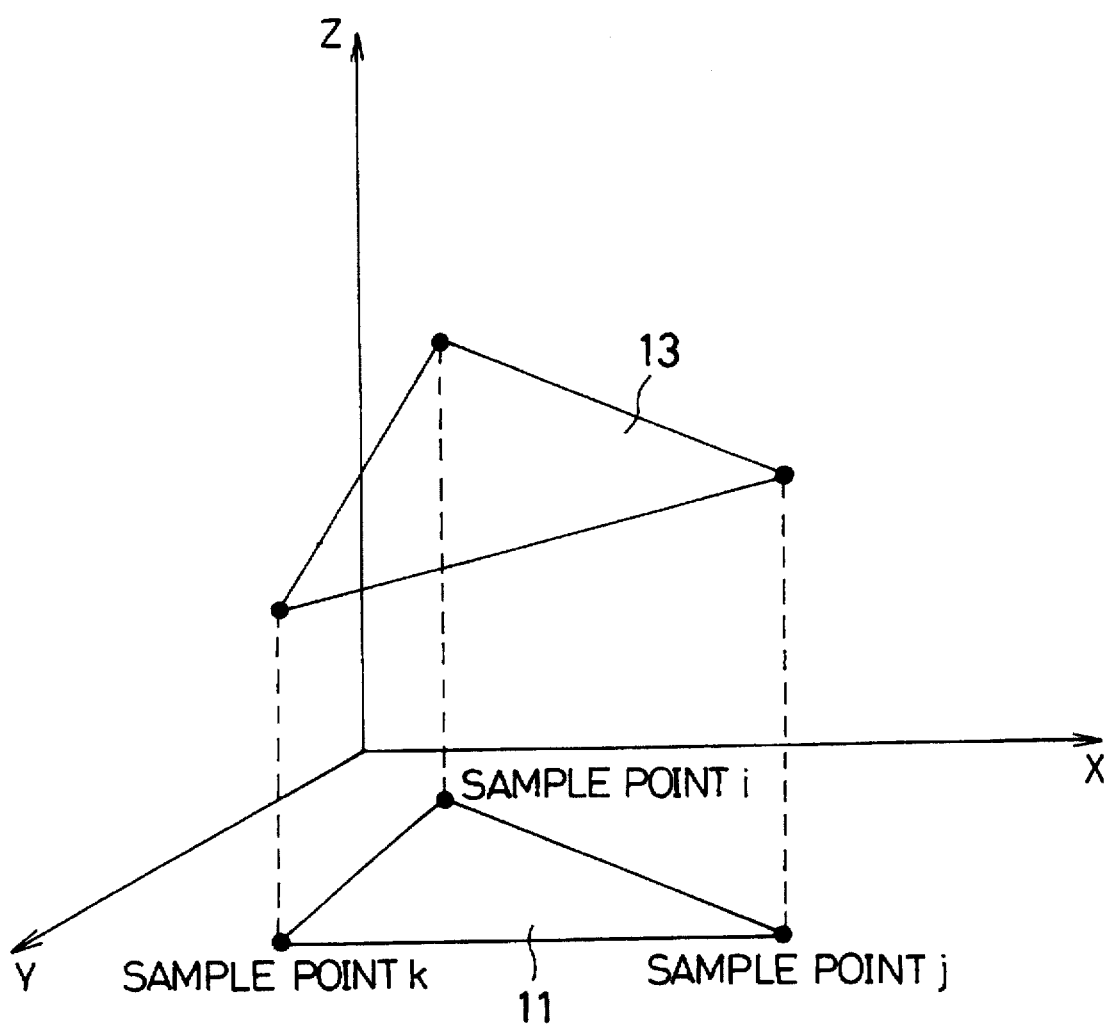
FIG. 14 describes a minimum unit density modification function modification surface.

The density modification function modifier 4 is described with reference to FIG. 5. The density modification function data 25, that is, ((mdi, mdj, mdk), mdout) is input to a minimum unit density modification function modification surface creation circuit 61 in FIG. 5. As shown in FIG. 14, a triangular density modification function modification region 11 is plotted for the four values in mdout in an XYZ space where the coordinates relative to the input image of (i), (j), and (k) are referred to as (Xi, Yi), (Xj, Yj), and (Xk, Yk) and are used as values on the X and Y axes and (mdi, mdj, and mdk) in the density modification function data 25 are used as values on the Z axis. The plane formed by the three points obtained is a minimum unit density modification function modification surface 13. In this case, four such surfaces are created. A method for creating a minimum unit density modification function modification surface 13 is described: (i), (j), and (k) have (Xi, Yi), Yj), and (Xk, Yk) as well as ((mdi, mdj, mdk), mdout). These coordinates and (mdi, mdj, mdk) are assigned to Equation (10) for mdout to solve the ternary simultaneous equations. This provides coefficients A, B, C, and D in Equation (10) for mdout to determine the minimum unit density modification function modification surface 13.

For example, Equations (11), (12), and (13) are ternary simultaneous equations for determining a minimum unit density modification function modification surface 13 for (ax, a') (x=i, j, k). Similar calculations are carried out for the other density values.

A density modification function creation circuit 62 uses the distances between three sample points and those target pixels other than the sample points within a minimum unit density modification function modification surface to modify the density modification functions for the three points to determine the density modification functions for the target pixels. This determination method is described with reference to FIGS. 7a to 7d and 8a to 8c: On a minimum unit density modification function modification surface 13, the modification functions for the three sample points (i), (j), and (k) have been determined as shown in FIGS. 7b to 7d. Elements ((mdi, mdj, mdk), mdout) and coefficients A, B, C, and D are assigned to Equation (10) to determine the input density value of a particular pixel to generate a density modification function. When the three sample points are the vertexes of a triangle, the density modification function varies dynamically between the sample points 1 and 2 as shown in FIGS. 8a to 8c.

In addition, the reference density modification function 12 is arbitrary and any such function can be used for a particular purpose. Parallel processing for individual minimum unit density modification function modification surfaces allows faster operation. The configuration of a device for parallel processing is similar to that in the first embodiment of this invention.

Many widely different embodiments of the present invention may be constructed without departing from the spirit and scope of the present invention. It should be understood that the present invention is not limited to the specific embodiments described in the specification, except as defined in the appended claims.

What is claimed is:

1. A density modification device comprising:

an image input section for dividing an input image into a plurality of triangular regions by selecting a plurality of sample points, each constituting an apex of a triangular region, and extracting the density values of each of said sample points and corresponding surrounding pixels of each of said sample points;

a feature parameter extractor for calculating the feature parameters of said sample points while determining a density modification determination method for each of the triangular regions by using said calculated feature parameters for two of the three sample points constituting a corresponding triangular region;

a density modification function generator for generating density modification functions for each of said sample points;

a density modification function modifier for determining each of the density modification functions for those points, other than said sample points in the triangular region, by using said determined density modification functions for the three sample points constituting the triangular region; and a processor for using the density modification functions, determined by said density modification function modifier, to modify the density of the triangular region.

2. A density modification device according to claim 1, wherein said density modification function modifier uses a determination signal issued by said feature parameter extractor to determine the density modification function determination method to dynamically change the density modification functions or add them up, thereby determining the density modification functions for those points other than said sample points in the triangular region.

3. A density modification device according to claim 2, wherein, when two of the three sample points constituting the triangular region are referred to as sample points 1 and 2, the maximum, average, and minimum density values of the pixels around the sample point 1 are referred to respectively as G1, M1, and L1, and the maximum, average, and minimum density values of the pixels around the sample point 2 are referred to respectively as G2, M2, and L2, if G1<L2 or G2<L1, said density modification function modifier uses a method of addition to determine the density modification functions within said triangular region; otherwise, said density modification function modifier uses a dynamic density modification function modification method to execute similar processing.

4. A density modification device according to claim 1, wherein said density modification function modifier further uses the distances among the three sample points and each of the pixels other than said sample points to determine density modification functions for said points other than said sample points.

5. A density modification device according to claim 1, wherein said feature parameter extractor calculates feature parameters of said sample points using maximum, average and minimum density values among density values of said sample points and corresponding surrounding pixels of each of said sample pixels.

6. A density modification device comprising:

an image input section for dividing an input image into a plurality of triangular regions by selecting a plurality of sample points, each constituting an apex of a triangular region, and extracting the density values of each of said sample points and corresponding surrounding pixels of each of said sample points;

a sample reorganization section for determining whether or not to reorganize the combination of the three sample points, each constituting the triangular region, by using the density values of said three sample points and, based on this determination, reorganizing the combination of said three sample points by adding a new sample point and dividing the triangular region into a plurality of triangular regions;

a feature parameter extractor for calculating the feature parameters of the sample points;

a density modification function generator for generating density modification functions for said sample points;

a density modification function modifier for determining each of the density modification functions for those points, other than said sample points in the triangular region, by using said determined density modification functions for the three sample points constituting the triangular region; and a processor for using the density modification functions determined by said density modification function modifier to modify the density of the triangular region.

7. A density modification device according to claim 6, wherein, if the average density values of the sample points are referred to as ni, nj, and nk, and $|ni-nj|+|nj-nk|+|nk-ni|>$Constant, said sample point reorganization section adds a new sample point onto a side or inside of the triangular region.

8. A density modification device according to claim 6, wherein said density modification function modifier further uses the distances among the three sample points and each of the pixels other than said sample points to determine density modification functions for said points other than said sample points.

9. A density modification device according to claim 6, wherein said feature parameter extractor calculates feature parameters of said sample points using maximum, average and minimum density values among density values of said sample points and corresponding surrounding pixels of each of the sample points.

* * * * *